United States Patent
Nitz

(10) Patent No.: US 11,430,294 B2
(45) Date of Patent: Aug. 30, 2022

(54) LOTTERY TRANSACTION PROCESSING SYSTEM

(71) Applicant: Multi-State Lottery Association, Urbandale, IA (US)

(72) Inventor: Robert J. Nitz, Ames, IA (US)

(73) Assignee: Multi-State Lottery Association, Urbandale, IA (US)

( * ) Notice: Subject to any disclaimer, the term of this patent is extended or adjusted under 35 U.S.C. 154(b) by 0 days.

(21) Appl. No.: 16/362,927

(22) Filed: Mar. 25, 2019

(65) Prior Publication Data

US 2020/0312090 A1 Oct. 1, 2020

(51) Int. Cl.
  A63F 13/00 (2014.01)
  G07F 17/32 (2006.01)
  H04L 9/32 (2006.01)

(52) U.S. Cl.
  CPC ........ *G07F 17/3241* (2013.01); *G07F 17/329* (2013.01); *G07F 17/3223* (2013.01); *H04L 9/3247* (2013.01)

(58) Field of Classification Search
  CPC ............................ A63F 3/0605; A63F 3/0655
  See application file for complete search history.

(56) References Cited

U.S. PATENT DOCUMENTS

| | | | |
|---|---|---|---|
| 6,887,152 B2 | 5/2005 | Stanek | |
| 6,934,846 B2 | 8/2005 | Szrek et al. | |
| 8,298,063 B2 | 10/2012 | Packes, Jr. et al. | |
| 2004/0185931 A1* | 9/2004 | Lowell | G07F 17/329 463/17 |
| 2007/0213125 A1 | 9/2007 | Szrek et al. | |
| 2008/0207296 A1* | 8/2008 | Lutnick | G07F 17/3272 463/16 |
| 2010/0113124 A1* | 5/2010 | Amirsadri | G07F 17/3267 463/17 |
| 2012/0178513 A1 | 7/2012 | Jackson et al. | |
| 2015/0080114 A1 | 3/2015 | Tipton et al. | |
| 2016/0240037 A1* | 8/2016 | Robbins | G07F 17/3225 |
| 2018/0275565 A1 | 9/2018 | Hamman et al. | |

OTHER PUBLICATIONS

Medeleanu, F.; et al. (2016). Developing and Modeling a New E-lottery System Using Anonymous Signatures. "Mircea cel Batran" Naval Academy Scientific Bulletin, XIX(1):242-248.

* cited by examiner

*Primary Examiner* — Omkar A Deodhar
*Assistant Examiner* — Eric M Thomas
(74) *Attorney, Agent, or Firm* — Faegre Drinker Biddle & Reath LLP

(57) ABSTRACT

A lottery transaction processing method is provided and includes receiving a lottery play request by a lottery play generation processor. The method further includes generating play information including a unique play serial number, and a play random number key, by the play generation processor, generating a play digital signature as a function of the play information and the play random number key by the play generation processor, transmitting the play information and the play digital signature, but not the play random number key, over a network to a gaming system server for storage by the gaming system server, and issuing a lottery play record including the play information and the play random number key by the play generation processor.

8 Claims, 7 Drawing Sheets

# LOTTERY TRANSACTION PROCESSING SYSTEM

FIELD OF THE DISCLOSURE

The present disclosure relates generally to lottery game transaction processing systems and methods.

BACKGROUND OF THE DISCLOSURE

Lottery systems provide the public with the chance to win prizes through the purchase of lottery tickets. Tickets can be won after a specified event such as a drawing, for example. Commonly, customers purchase their tickets at dedicated point-of-sale terminals located at retail stores or similar establishments. A point-of-sale terminal communicates with a central lottery server to exchange information associated with a given lottery transaction. For each transaction, the customers can select their own numbers or have a machine randomly select numbers for them. In any event, the point-of-sale terminal transmits the selected numbers to the central lottery server to be stored and receives directions to print the associated lottery ticket locally. The printed lottery ticket contains the selected numbers and a serial number that is unique to the ticket for validation and redemption purposes. At some point-of-sale terminals, an encrypted control number generated based a random number key is also printed on the ticket.

Currently, only the serial number printed on the ticket is typically checked for the validity of the ticket prior to redemption. The encrypted control number is sometimes manually checked on a standalone computer for higher tier payouts. There remains a need to develop faster and more efficient lottery transaction processing systems that can improve the validation and redemption process.

SUMMARY OF THE DISCLOSURE

In one embodiment of the present disclosure, a lottery transaction processing method is provided and includes receiving a lottery play request by a lottery play generation processor. The method further includes generating play information including a unique play serial number, and a play random number key, by the play generation processor, generating a play digital signature as a function of the play information and the play random number key by the play generation processor, transmitting the play information and the play digital signature, but not the play random number key, over a network to a gaming system server for storage by the gaming system server, and issuing a lottery play record including the play information and the play random number key by the play generation processor.

In one example, wherein issuing the lottery play record includes one or both of printing a lottery ticket and transmitting an electronic lottery ticket record.

In another example, wherein the method further includes receiving an authorization to issue the lottery play record at the lottery play generation processor from the gaming system server, and issuing the lottery play record includes issuing the lottery play record in response to the receipt of the authorization.

In yet another example, the method further includes receiving and storing the play information and play digital signature by the gaming system server. In a variation, the method further includes transmitting the play information and play digital signature over a network to a lottery internal control system for storage by the lottery internal control system. In another variation, the method further includes receiving and storing the play information and play digital signature by the lottery internal control system.

In still another example, the method further includes receiving a redemption serial number and a redemption random number key from a lottery play record to be validated by a lottery redemption processor, and transmitting the redemption serial number and redemption random number key over a network to the gaming system server.

In yet still another example, the method further includes receiving by the gaming system server over a network a redemption serial number of a lottery play record to be validated, retrieving the play information and the play digital signature associated with the received redemption serial number from storage by the gaming system server, generating a validation digital signature as a function of the play information retrieved from storage by the gaming system server and a redemption random number key of the lottery play record to be validated, and comparing the validation digital signature to the play digital signature retrieved from storage by the gaming system server to validate authenticity of the lottery play record being validated, wherein if the validation digital signature matches the play digital signature, the redemption random number key matches the play random number key and the play record being validated is authentic, and wherein if the validation digital signature does not match the play digital signature, the redemption random number key does not match the play random number key and the play record being validated is not authentic.

In a variation, the method further includes receiving by the gaming system server of the network the redemption random number key, generating the validation digital signature includes generating the validation digital signature by the gaming system server, and comparing the validation digital signature to the play digital signature includes comparing the validation digital signature to the play digital signature by the gaming system server. In another variation, the method further includes transmitting the play information and play digital signature over a network from the gaming system server to a lottery internal control system for storage by the lottery internal control system, transmitting the redemption serial number and the redemption random number key of the lottery play record to be validated from the gaming system server to the lottery internal control system if the authenticity of the lottery play record is validated by the gaming system server, retrieving the play information and play digital signature associated with the redemption serial number from storage by the lottery internal control system, generating a presentment digital signature as a function of the play information retrieved from storage by the lottery internal control system and the redemption random number key by the lottery internal control system, comparing the presentment digital signature to the play digital signature retrieved from storage by the lottery internal control system to validate presentment of the lottery play record being validated, wherein if the presentment digital signature matches the play digital signature the lottery play record being validated was presented for payment.

In yet another variation, the method further includes transmitting the retrieved play information and play digital signature over a network to a lottery play redemption processor, generating the validation digital signature includes generating the validation digital signature by the lottery play redemption processor, and comparing the validation digital signature to the play digital signature includes comparing the validation digital signature to the play digital signature by the lottery play redemption processor.

In still another variation, the method further includes transmitting the play information and play digital signature over a network from the gaming system server to a lottery internal control system for storage by the lottery internal control system, transmitting the redemption serial number and redemption random number key of the lottery play record over a network from the lottery play redemption processor to the gaming system server if the authenticity of the lottery play record is validated by the lottery play redemption processor, transmitting the redemption serial number and the redemption random number key of the lottery play record from the gaming system server to the lottery internal control system, retrieving the play information and play digital signature associated with the redemption serial number from storage by the lottery internal control system, generating a presentment digital signature as a function of the play information retrieved from storage by the lottery internal control system and the redemption random number key by the lottery internal control system, and comparing the presentment digital signature to the play digital signature retrieved from storage by the lottery internal control system to validate presentment of the lottery play record being validated, wherein if the presentment digital signature matches the play digital signature the lottery play record being validated was presented for payment.

In yet still another variation, the method further includes transmitting the play information and play digital signature over a network from the gaming system server to a lottery internal control system for storage by the lottery internal control system, transmitting the redemption serial number and the redemption random number key of the lottery play record to be validated from the gaming system server to the lottery internal control system if the authenticity of the lottery play record is validated, retrieving the play information and play digital signature associated with the redemption serial number from storage by the lottery internal control system, generating a presentment digital signature as a function of the play information retrieved from storage by the lottery internal control system and the redemption random number key by the lottery internal control system, and comparing the presentment digital signature to the play digital signature retrieved from storage by the lottery internal control system to validate presentment of the lottery play record being validated, wherein if the presentment digital signature matches the play digital signature the lottery play record being validated was presented for payment.

In another embodiment of the present disclosure, a lottery transaction processing method is provided and includes receiving a redemption serial number of a lottery play record to be validated over a network using a gaming system server. The method further includes retrieving play information and play digital signature associated with the received redemption serial number from storage by the gaming system server, generating a validation digital signature as a function of the play information retrieved from the storage by the gaming system server and a redemption random number key of the lottery play record to be validated, comparing the validation digital signature to the play digital signature retrieved from the storage by the gaming system server to validate authenticity of the lottery play record being validated, and determining, by the gaming system server, the authenticity of the lottery play record based on a match between the validation digital signature and the play digital signature.

In one example, the method further includes receiving by the gaming system server of the network the redemption random number key, generating the validation digital signature includes generating the validation digital signature by the gaming system server, and comparing the validation digital signature to the play digital signature includes comparing the validation digital signature to the play digital signature by the gaming system server.

In another example, the method further includes at least one of: transmitting the play information and play digital signature over a network from the gaming system server to a lottery internal control system for storage by the lottery internal control system, and transmitting the play information and play digital signature over a network from the gaming system server to a lottery play redemption processor for storage by the lottery play redemption processor.

In yet another example, the method further includes transmitting the redemption serial number and the redemption random number key of the lottery play record to be validated from the gaming system server to the lottery internal control system if the authenticity of the lottery play record is validated by the gaming system server.

In yet another embodiment of the present disclosure, a lottery transaction processing method is provided and includes receiving a redemption serial number and a redemption random number key of a lottery play record to be validated. The method further includes retrieving play information and play digital signature associated with the redemption serial number from storage by the lottery internal control system, generating a presentment digital signature as a function of the play information retrieved from the storage by the lottery internal control system and the redemption random number key by the lottery internal control system, comparing the presentment digital signature to the play digital signature retrieved from storage by the lottery internal control system to validate presentment of the lottery play record being validated, and determining, by the lottery internal control system, authenticity of the presentment of the lottery play record based on a match between the presentment digital signature and the play digital signature.

In one example, the method further includes receiving the play information and play digital signature over a network from a gaming system server for storage by the lottery internal control system, and receiving the redemption serial number and the redemption random number key of the lottery play record to be validated from the gaming system server by the lottery internal control system if the authenticity of the lottery play record is validated.

In another example, the method further includes determining whether the lottery play record being validated was presented for payment if the presentment digital signature matches the play digital signature.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The variations will be more readily understood in view of the following description when accompanied by the below figures and wherein like reference numerals represent like elements, wherein.

DETAILED DESCRIPTION OF EMBODIMENTS

Preferred embodiments of the present disclosure are described below by way of example only, with reference to the accompanying drawings. Further, the following description is merely exemplary in nature and is in no way intended to limit the disclosure, its application, or uses. As used herein, the term "module" or "unit" may refer to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the modules, the scope of the present system should not be so limited since other modifications will become apparent to the skilled practitioner.

Figure 1:
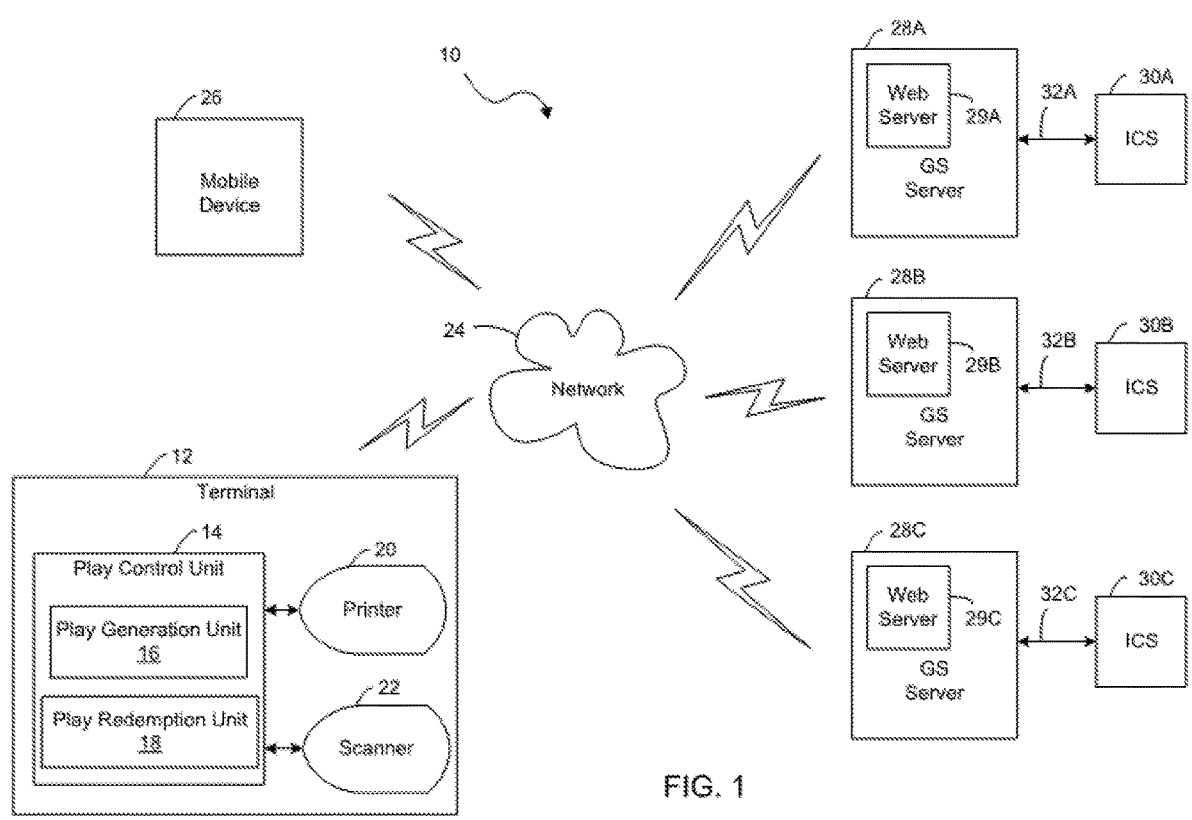
FIG. 1 is a schematic diagram of a lottery transaction processing system in accordance with embodiments of the present disclosure.

Referring now to FIG. 1, a lottery transaction processing system 10 provides, in real time, an efficient way to issue, validate, and redeem lottery tickets. The lottery transaction processing system 10 includes a terminal 12 communicably connected to a gaming system (GS) server such as 28A, 28B, 28C (also designated 28 for any one of GS servers) via a network 24. The terminal 12 issues lottery tickets to users and redeems lottery tickets presented by users for payout. For example, terminals such as 12 can be installed as a point-of-sale terminal at retail stores.

The GS servers 28A-28C are commonly provided by a different lottery operating jurisdiction (e.g., individual state lottery systems) to manage lottery games played in the jurisdiction by authorizing the issuance of lottery tickets and performing the validation and redemption of the lottery tickets. In one embodiment, the GS server 28A is associated with the state lottery system of a first jurisdiction (e.g., Illinois), the GS server 28B is associated with the state lottery system of a second jurisdiction (e.g., Michigan), and the GS server 28C is associated with the state lottery system of a third jurisdiction (e.g., Ohio). In some embodiments, each jurisdiction can have one or more GS servers 28. Each of the GS servers 28A, 28B, 28C is connected to a respective lottery internal control system (ICS) 30A, 30B, 30C (also designated 30 for any one of ICSs) via a respective network 32A, 32B, 32C. The ICSs 30A-30C provide support services to audit lottery ticket transactions including monitoring, logging, verifying, and balancing the transactions in real, or near-real time. In another example, each ICS 30A, 30B, 30C performs the validation and redemption of the lottery tickets in conjunction with a corresponding GS server 28A, 28B, 28C. While only three GS servers and ICSs are shown in FIG. 1, any number of GS servers and/or ICSs may be contemplated in other embodiments.

When a user, in a given jurisdiction, decides to play the lottery, the user proceeds to purchase a lottery ticket. In one embodiment, the user can purchase the lottery ticket using the terminal 12, which is configured to communicate with a GS server 28 of the given jurisdiction's lottery system (e.g., GS server 28A) to process the transaction. The terminal 12 includes a play control unit 14 configured to control at least a portion of the lottery ticket transaction.

In another embodiment, the user can purchase the lottery ticket using a mobile device 26 (e.g., a smartphone) or any other computing device (e.g., a laptop, a desktop, a tablet, a smartwatch, etc.). In this scenario, the functionality of the play control unit 14 is provided by the GS server 28A. For example, the GS server 28A includes a web server 29A hosting a website that can be accessed by the mobile device 26 using, for example, a uniform resource locator (URL). The web server 29A is configured to receive and process lottery ticket transaction requests from the mobile device 26 via the network 24. Accordingly, the web server 29A can be used for the electronic issuance of the lottery ticket to the mobile device 26. The web server 29A can be implemented as part of the GS server 28A or can be implemented in dedicated hardware coupled to the GS server 28A via local networks. In general, each of the GS servers 28A, 28B, 28C can have a respective web server 29A, 29B, 29C (also designated 29 for any one of web servers) as shown in FIG. 1.

Any suitable communication network is contemplated for the network 24 as well as the networks 32A-32C. For example, the terminal 12 and/or the mobile device 26 can be communicably connected to a GS server 28 via the Internet 24. As another example, the GS servers 28A-28C can be communicably connected to the ICSs 30A-30C via LANs 32A-32C. Other similar communication networks known in the art are also contemplated.

To issue the lottery ticket, a lottery play request is received. In one example, the lottery play request is received at the terminal 12 from the user. As such, the play control unit 14 includes a play generation unit 16, which is a lottery play generation processor configured to receive the lottery play request and issue the lottery ticket. Interactions between the terminal 12 and the user is managed by a human machine interface (HMI), such as a keyboard, a touch sensitive pad or screen, a mouse, a trackball, a voice recognition system, and the like. In another example, the lottery play request is received at the web server 29A from the mobile device 26 via the network 24.

The play generation unit 16 is configured to generate play information P including a unique play serial number N, and a play random number key K. In one embodiment, the play information P includes the unique play serial number N and other play data such as draw numbers selected by the user, draw numbers selected by the play generation unit 16 (e.g., if the user does not request specific draw numbers), a draw date, and the like. The play random number key K can be generated using conventional or otherwise known random number generation methods.

The play generation unit 16 is configured to generate a play digital signature S as a function of the play information P and the play random number key K. In one example, the play generation unit 16 uses a hash-based message authentication code (HMAC) method to generate the play digital signature S based on the play information P and the play random number key K. Other suitable cryptographic methods, such as tag authentication techniques, are also contemplated.

The play generation unit 16 is configured to transmit the play information P and the play digital signature S, but not the play random number key K, via the network 24, to a corresponding GS server 28 for storage. The corresponding GS server 28 in turn transmits the play information P and the play digital signature S to an ICS 30 associated with the corresponding GS server 28 for further storage.

When the corresponding GS server 28 authorizes the issuance of the lottery ticket, the play generation unit 16 issues a lottery play record that includes the play information P and the play random number key K. The play information P including the unique play serial number N, and the play random number key K can be shown on the lottery play record as text and/or as a barcode. Issuing the lottery play record includes printing a physical lottery ticket and/or transmitting an electronic lottery ticket. When using the terminal 12, the play generation unit 16 causes a printer 20 to print a physical copy of the lottery play record. On the other hand, when using the mobile device 26, the web server 29 causes an electronic copy of the lottery play record to be transmitted to the mobile device 26.

To redeem the lottery ticket, lottery redemption information is received. As such, the control unit 14 includes a play redemption unit 18, which is a lottery redemption processor configured to receive the lottery redemption information. At the time of redemption, the lottery play record, either in the form of a physical lottery ticket or an electronic lottery ticket stored in a device such as the mobile device 26, is presented by the user and scanned using a scanner 22 to read information on the lottery play record. For example, the scanner 22 can read a barcode on the lottery play record.

In one embodiment, the play redemption unit 18 is configured to receive a redemption serial number N' and a redemption random number key K' (e.g., contained in a barcode) of the presented lottery play record to be validated by the lottery redemption unit 18. For validation purposes, the lottery redemption unit 18 transmits the redemption serial number N' and the redemption random number key K' via the network 24 to the corresponding GS server 28. In another embodiment, the play redemption unit 18 is configured to receive only the redemption serial number N' from the presented lottery play record to be validated by the lottery redemption unit 18. In this case, the lottery redemption unit 18 transmits only the redemption serial number N' via the network 24 to the corresponding GS server 28 for validation purposes.

Figure 2:
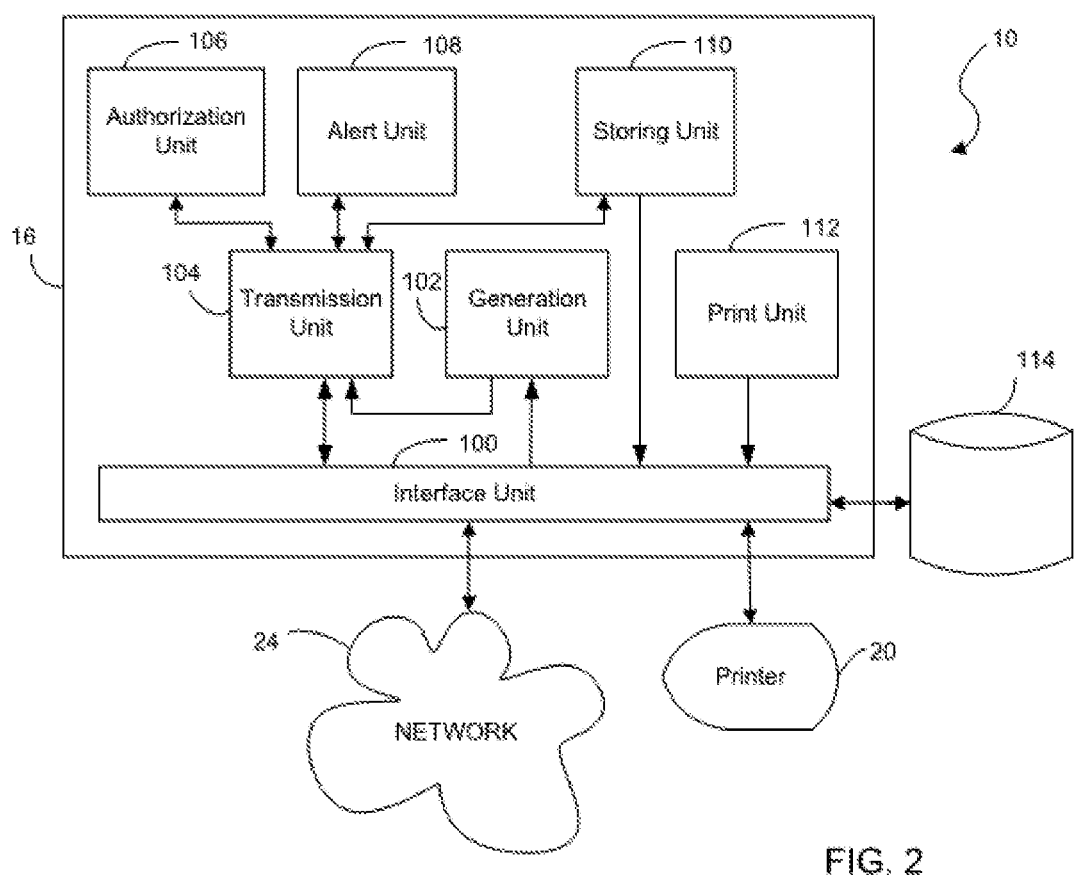
FIG. 2 is a schematic diagram of a play generation unit of the lottery transaction processing system of FIG. 1 in accordance with embodiments of the present disclosure.

Referring now to FIG. 2, an exemplary configuration of the play generation unit 16 is shown. The play generation unit 16 includes an interface unit 100, a generation unit 102, a transmission unit 104, an authorization unit 106, an alert unit 108, a storing unit 110, and a print unit 112. Although these sub-units 100-112 are illustrated as children modules subordinate of the parent unit 16, each sub-unit can be operated as a separate unit from the parent unit 16, and other suitable combinations of sub-units are contemplated to suit different applications. One or more modules or units can be selectively bundled as a key software model running on the processor having software as a service (SaaS) features.

Relevant information can be stored in a database 114 (e.g., as a non-transitory data storage device and/or a machine-readable data storage medium carrying computer-executable instructions) for retrieval by the play generation unit 16 and its children units or modules.

The interface unit 100 is configured to provide an interface between the play generation unit 16, the database 114, and the network 24. The interface unit 100 controls operation of, for example, the network 24, the printer 20, the scanner 22, and other related system devices, services, and applications. The other devices, services, and applications may include, but are not limited to, one or more software or hardware components, etc., related to the terminal 12. The interface unit 100 also receives data or information from a corresponding GS server 28, which are communicated to the respective modules, such as the play generation unit 16 and its children units.

The generation unit 102 is configured to receive the lottery play request. The generation unit 102 is configured to generate the play information P including the unique play serial number N, and the play random number key K. The generation unit 102 is also configured to generate the play digital signature S as a function of the play information P and the play random number key K.

The transmission unit 104 is configured to transmit data or information relevant to the lottery play request to other units 100, 106, 108, 110, and facilitate the delivery of the data or information to the corresponding GS server 28 via the network 24. For example, using the interface unit 100, the transmission unit 104 transmits the play information P and the play digital signature S (except the play random number key K) via the network 24 to the corresponding GS server 28 for storage.

The authorization unit 106 is configured to receive an authorization from the corresponding GS server 28 to issue the lottery play record. In response to receiving the authorization, the print unit 112 issues the lottery play record including the play information P and the play random number key K. In one embodiment, the issuance of the lottery play record includes one or both of printing a physical lottery ticket record and transmitting an electronic lottery ticket record to another device via the network 24.

The alert unit 108 is configured to inform the user or other systems of any detected errors during operation. One or more warning messages are sent by the alert unit 108 to a mobile device (e.g., mobile device 26) or any computing device to alert the user. It is also contemplated that when one or more errors are detected, the alert unit 108 displays or prints relevant data or information such as a timestamp or a location of the terminal 12.

The storing unit 110 is configured to store relevant information related to the lottery play request in the database 114. In one embodiment, the storing unit 110 receives the play information P and the play digital signature S from the transmission unit 104, which were generated by the generation unit 102, and stores them (i.e., P, S) in the database 114 using the interface unit 100. In one embodiment, the database 114 is part of the terminal 12. In another embodiment, the database 114 is part of the corresponding GS server 28. For example, the corresponding GS server 28 receives the play information P and the play digital signature S from the play generation unit 16 and stores them in the database 114.

Further, the corresponding GS server 28 is configured to transmit the play information P and the play digital signature S via the network 32 to an ICS 30 associated with the corresponding GS server 28 for further storage. As is the case with the GS server 28, the ICS 30 receives the play information P and the play digital signature S (but not the random number key K) and stores them in a database 114 of the ICS 30 (which can be a different database than the database of the corresponding GS server 28). As such, the database 114 can be located independently or separately in any of the terminal 12, the GS server 28, and the ICS 30. In another example, the database 114 can a central storage shared by any of the terminal 12, the GS server 28, and the ICS 30. In various embodiments, the database 114 includes aggregated information including timestamps, location data, and analysis data about errors, users, issuance, and redemption events for purposes of algorithm research and development.

Figure 3:
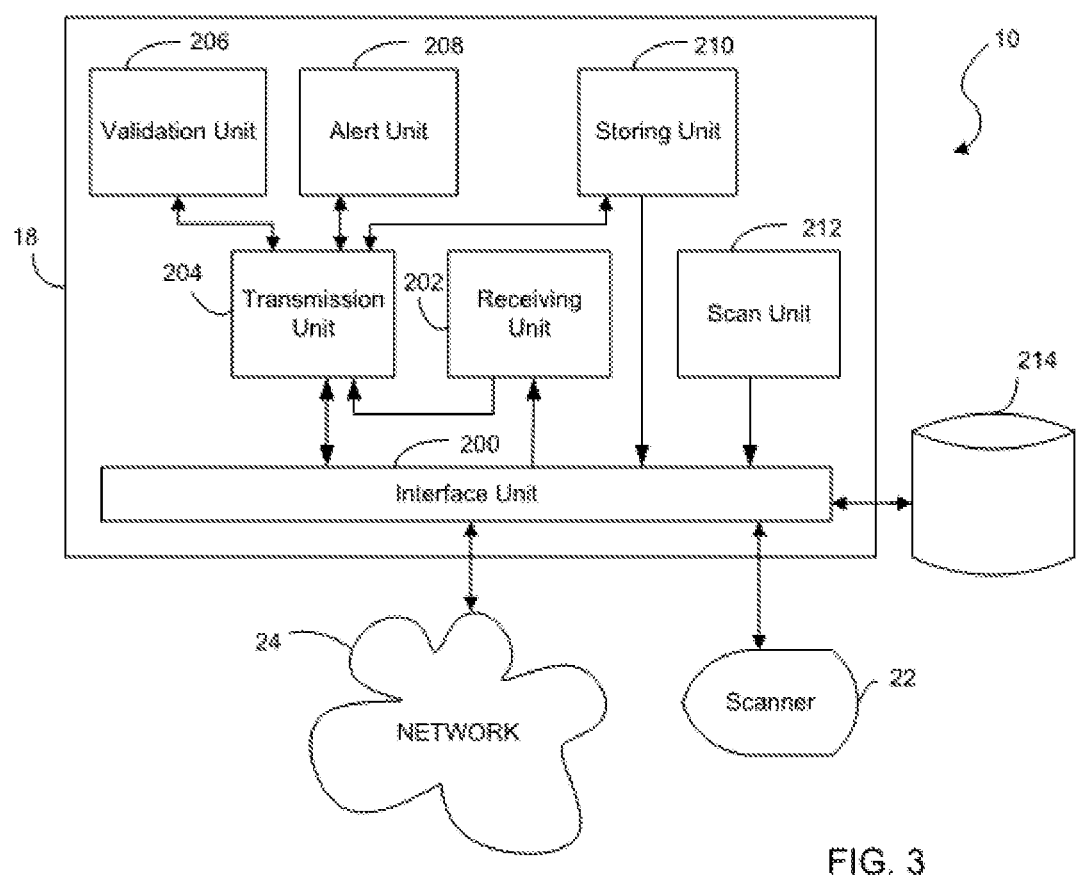
FIG. 3 is a schematic diagram of a play redemption unit of the lottery transaction processing system of FIG. 1 in accordance with embodiments of the present disclosure.

Referring now to FIG. 3, an exemplary configuration of the play redemption unit 18 is shown. The play redemption unit 18 includes an interface unit 200, a receiving unit 202, a transmission unit 204, a validation unit 206, an alert unit 208, a storing unit 210, and a scan unit 212. Although these sub-units 200-212 are illustrated as children modules subordinate of the parent unit 18, each sub-unit can be operated as a separate unit from the parent unit 18, and other suitable combinations of sub-units are contemplated to suit different applications.

The interface unit 200 operates similarly with the interface unit 100. During redemption, the scan unit 212 scans the lottery play record presented by the user using the scanner 22 to read information on the lottery play record. In one embodiment, the receiving unit 202 is configured to receive the redemption serial number N' and the redemption random number key K' contained in a barcode of the presented lottery play record.

The validation unit 206 is configured to perform a validation process of the presented lottery play record. Accordingly, the validation unit 206 instructs the transmission unit 204 to transmit the redemption serial number N' and the redemption random number key K' via the network 24 to the corresponding GS server 28. In another embodiment, the receiving unit 202 is configured to receive only the redemption serial number N' from the presented lottery play record. In this case, the validation unit 206 instructs the transmission unit 204 to transmit only the redemption serial number N' via the network 24 to the corresponding GS server 28 for validation.

The alert unit 208 is configured to inform the user or other systems of any detected errors during the validation process. The storing unit 210 is configured to store relevant information related to the validation process in a database 214, which can be the same as the database 114 in FIG. 2 or can be a different database that operates similarly to the database 114.

Figure 4:
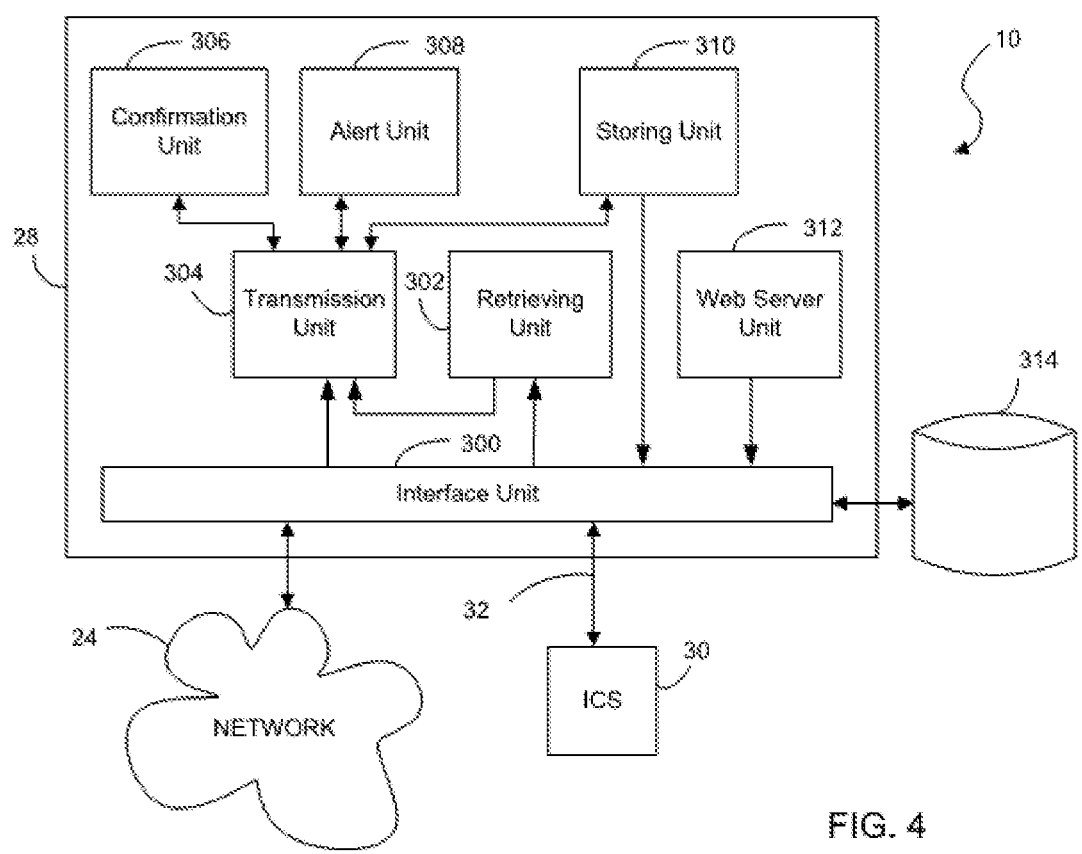
FIG. 4 is a schematic diagram of a gaming system server of the lottery transaction processing system of FIG. 1 in accordance with embodiments of the present disclosure.

Referring now to FIG. 4, an exemplary configuration of a GS server 28 is shown. The GS server 28 includes an interface unit 300, a retrieving unit 302, a transmission unit 304, a confirmation unit 306, an alert unit 308, a storing unit 310, and a web server unit 312. Although these sub-units 300-312 are illustrated as children modules subordinate of the parent unit 28, each sub-unit can be operated as a separate unit from the parent unit 28, and other suitable combinations of sub-units are contemplated to suit different applications.

The interface unit 300 operates similarly with the interface units 100 and 200. During the validation process, the retrieving unit 302 is configured to receive, via the network 24, the redemption serial number N' of the lottery ticket (or both the redemption serial number N' and the redemption random number key K') from the play redemption unit 18. The retrieving unit 302 retrieves the play information P and the play digital signature S associated with the received redemption serial number N' (or both the received redemption serial number N and the redemption random number key K') from the database 114.

The transmission unit 304 is configured to transmit data or information relevant to the lottery play record to other units 300, 306, 308, 310, 312 and facilitate the delivery of the data or information to/from the GS server 28 via the network 24 and/or to/from an ICS 30 via the network 32.

The confirmation unit 306 is configured to generate a validation digital signature S' as a function of the play information P retrieved from a database 314 and the redemption random number key K' of the lottery play record to be validated. The database 314 can be the same as the database 114 in FIG. 2 or can be a different database that operates similarly to the database 114. The confirmation unit 306 is configured to compare the validation digital signature S' to the play digital signature S to validate the authenticity of the lottery play record being validated. If the validation digital signature S' matches the play digital signature S, then the redemption random number key K' matches the play random number key K. This means that the lottery play record being validated is authentic. However, if the validation digital signature S' does not match the play digital signature S, then the redemption random number key K' does not match the play random number key K. In this case, the lottery play record being validated is not authentic. If the lottery play record is determined to be not authentic, the confirmation unit 306 generates an error message (e.g., "please visit lottery office for payment") to send to the play redemption unit 18 to notify the user.

The alert unit 308 is configured to inform the user or other systems of any detected errors during the validation process (e.g., if the lottery play record was determined to be not authentic). The storing unit 310 is configured to store relevant information related to the validation process in the database 314.

In embodiments where the user purchases a lottery ticket using the mobile device 26, some functionalities of the play generation unit 16 (e.g., functionality of the generation unit 102) are provided by the GS server 28 in the web server unit 312. As such, the web server unit 312 is configured to receive the lottery play request from the mobile device 26, and generate the play information P and the play random number key K. The web server unit 312 is further configured to generate the play digital signature S as a function of the play information P and the play random number key K. The web server unit 312 also authorizes the issuance of the lottery play record to the mobile device 26.

Figure 5:
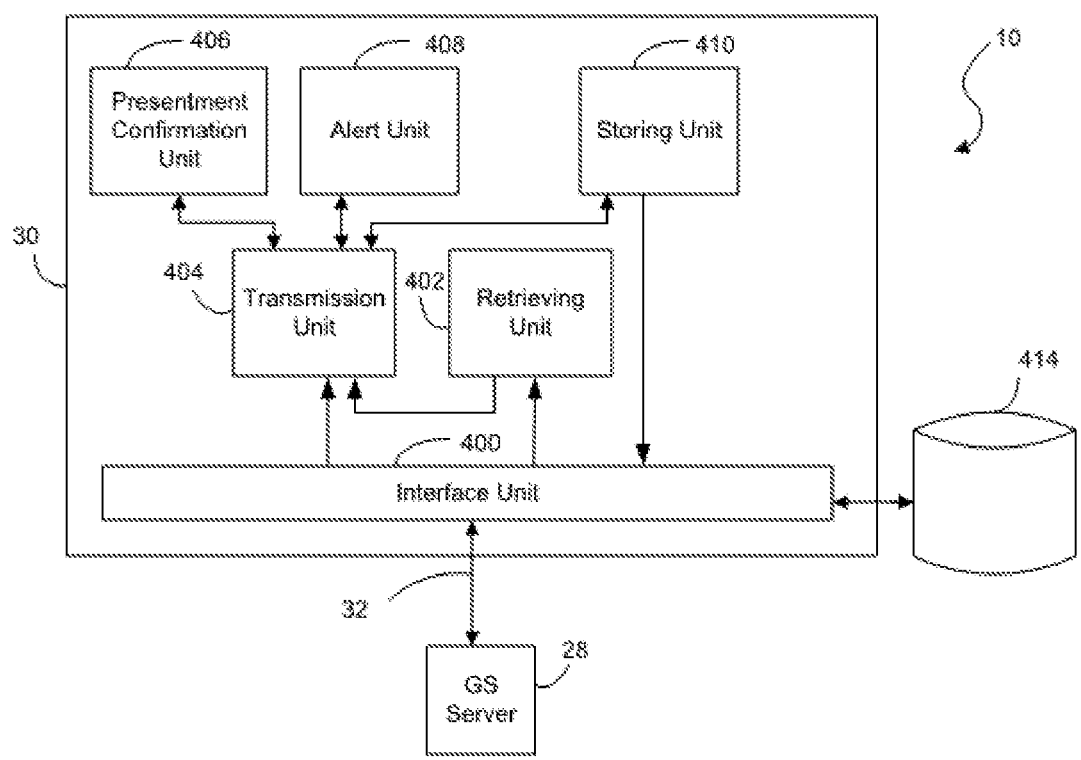
FIG. 5 is a schematic diagram of a lottery internal control system of the lottery transaction processing system of FIG. 1 in accordance with embodiments of the present disclosure.

Referring now to FIG. 5, an exemplary configuration of an ICS 30 is shown. The ICS 30 includes an interface unit 400, a retrieving unit 402, a transmission unit 404, a presentment confirmation unit 406, an alert unit 408, and a storing unit 410. Although these sub-units 400-410 are illustrated as children modules subordinate of the parent unit 30, each sub-unit can be operated as a separate unit from the parent unit 30, and other suitable combinations of sub-units are contemplated to suit different applications.

The interface unit 400 operates similarly with the interface units 100, 200 and 300. During the validation process, the retrieving unit 402 is configured to receive via the network 32 the play information P and the play digital signature S transmitted from the GS server 28, using the transmission unit 404. The retrieving unit 402 can store the received play information P and play digital signature S in a database 414, which can be the same as the database 114 in FIG. 2 or can be a different database that operates similarly to the database 114.

The transmission unit 404 is configured to transmit data or information relevant to the lottery play record to other units 400, 406, 408, 410 and facilitate the delivery of the data or information to/from the GS server 28 via the network 32. For example, the transmission unit 304 of the GS server 28 transmits the play information P and the play digital signature S via the network 32 to the ICS 30 for storage in the database 414. When the confirmation unit 306 of the GS server 28 determines that the validation digital signature S' and the play digital signature S are identical, the transmission unit 304 transmits the redemption serial number N' and the redemption random number key K' of the lottery play record to the ICS 30. The retrieving unit 402 retrieves the play information P and the play digital signature S associated with the redemption serial number N' from the database 414 using the transmission unit 404.

The presentment confirmation unit 406 is configured to generate a presentment digital signature S" as a function of the play information P retrieved from the database 414 by the ICS 30 and the redemption random number key K'. The presentment confirmation unit 406 is configured to compare the presentment digital signature S" to the play digital signature S retrieved from the database 414 to validate presentment of the lottery play record being validated. If the presentment digital signature S" matches the play digital signature S, the lottery play record being validated can be paid out to the user. However, if the presentment digital signature S" does not match the play digital signature S, the lottery play record being validated may not be paid out to the user.

The alert unit 408 is configured to inform the user or other systems of any detected errors during the validation process (e.g., if the payout cannot be made). The storing unit 410 is configured to store relevant information related to the validation process in the database 414.

Figure 6:
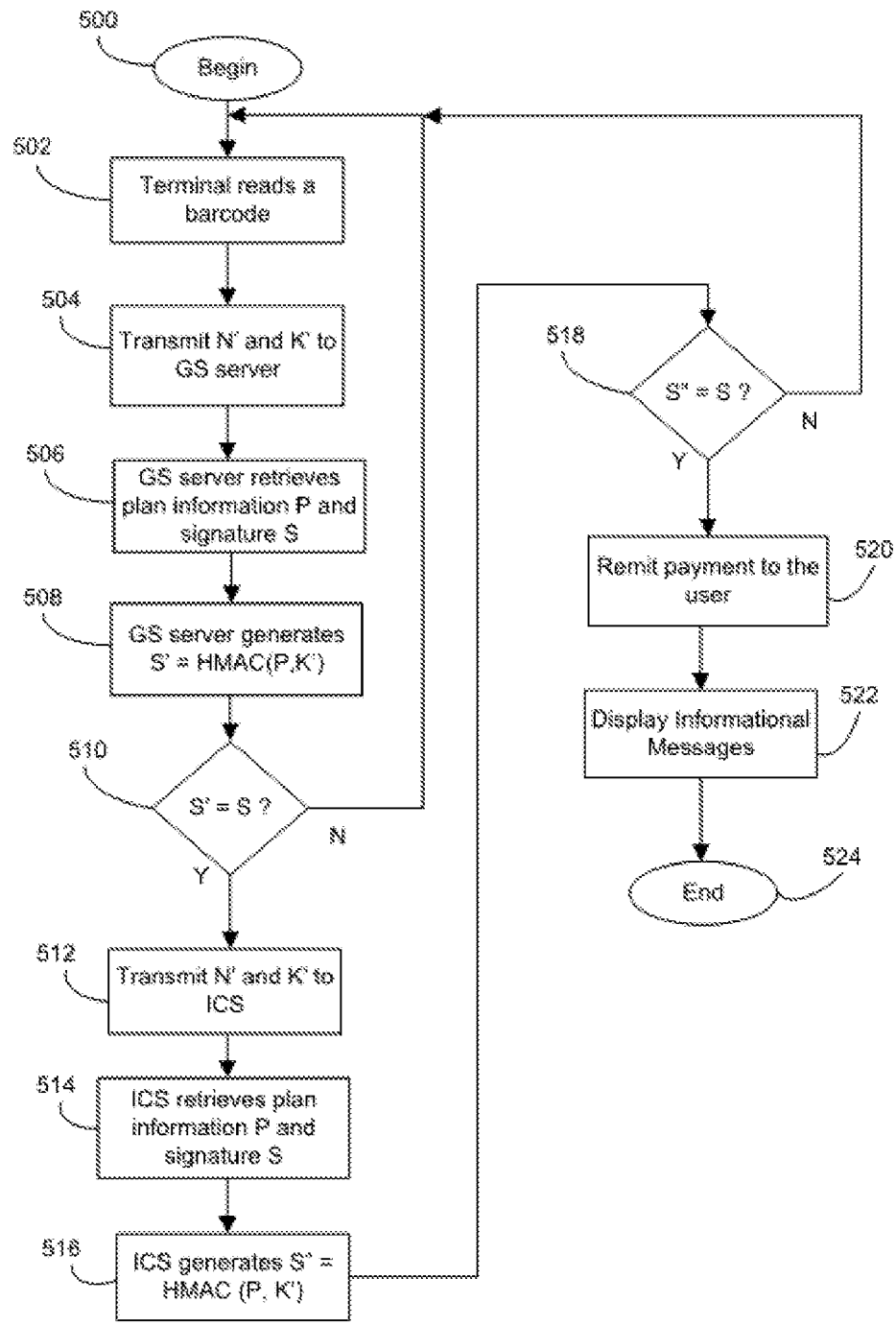
FIG. 6 is a flow chart of a first validation process method using the lottery transaction processing system of FIG. 1 in accordance with embodiments of the present disclosure.

Referring now to FIG. 6, an exemplary first validation process method using the lottery transaction processing system 10 is shown. Although the following steps are primarily described with respect to the embodiments of FIGS. 1-5, it should be understood that the steps within the method may be modified and executed in a different order or sequence without altering the principles of the present disclosure.

The method begins at step 500. In step 502, the scan unit 212 of the play redemption unit 18 reads a barcode on a lottery play record presented by a user for redemption. For example, the barcode includes the redemption serial number N' and the redemption random number key K' of the lottery play record to be validated.

In step 504, the validation unit 206 instructs the transmission unit 204 to transmit the redemption serial number N' and the redemption random number key K' via the network 24 to a corresponding GS server 28. In step 506, the retrieving unit 302 of the corresponding GS server 28 retrieves the play information P and the play digital signature S from the database 314 using the redemption serial number N'. In step 508, the confirmation unit 306 of the corresponding GS server 28 generates the validation digital signature S' as a function of the retrieved play information P and the redemption random number key K'. For example, the validation digital signature S' can be calculated using the HMAC method based on the play information P and the redemption random number key K'.

In step 510, the confirmation unit 306 of the corresponding GS server 28 compares the validation digital signature S' to the play digital signature S to validate the authenticity of the lottery play record being validated. If the validation digital signature S' matches the play digital signature S, the method proceeds to step 512. Otherwise, the method returns to step 502. In step 512, the transmission unit 304 of the corresponding GS server 28 transmits the redemption serial number N' and the redemption random number key K' of the lottery play record to an ICS 30 associated with the corresponding GS server 28.

In step 514, the retrieving unit 402 of the ICS 30 retrieves the play information P and the play digital signature S in the database 414 using the redemption serial number N'. In step 516, the presentment confirmation unit 406 of the ICS 30 generates the presentment digital signature S" as a function of the play information P retrieved from the database 114 and the redemption random number key K'. In step 518, the presentment confirmation unit 406 compares the presentment digital signature S" to the play digital signature S retrieved from the database 414 to validate presentment of the lottery play record being validated. If the presentment digital signature S" matches the play digital signature S, the method proceeds to step 520. Otherwise, the method returns to step 502.

In step 520, the presentment confirmation unit 406 of the ICS 30 authorizes payment remittance and transmits payment remittance information, such as a payment amount and a payment date, to the confirmation unit 306 of the corresponding GS server 28. In step 522, the confirmation unit 306 of the corresponding GS server 28 transmits any applicable informational messages related to the validation process to the print unit 112 of the play generation unit 16 via the network 24. The print unit 112 displays or prints the informational messages on the printer 20. The method ends at step 524 which may include a return to step 502. Any of steps 502-522 can be repeated as desired.

Figure 7:
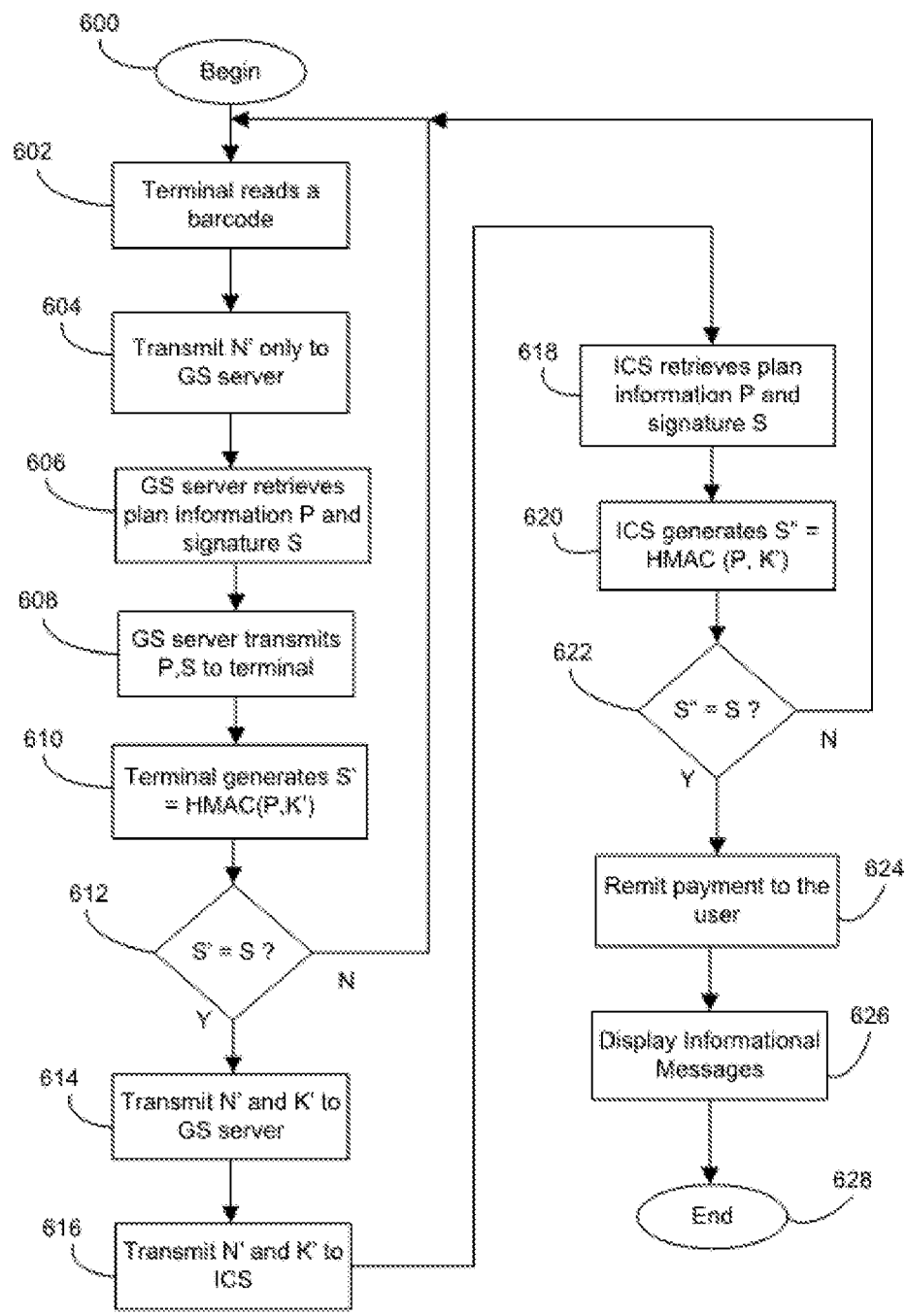
FIG. 7 is a flow chart of a second validation process method using the lottery transaction processing system of FIG. 1 in accordance with embodiments of the present disclosure.

Referring now to FIG. 7, an exemplary second validation process method using the lottery transaction processing system 10 is shown. Although the following steps are primarily described with respect to the embodiments of FIGS. 1-5, it should be understood that the steps within the method may be modified and executed in a different order or sequence without altering the principles of the present disclosure.

The method begins at step 600. In step 602, the scan unit 212 of the play redemption unit 18 reads a barcode on a lottery play record presented by a user for redemption. For example, the barcode includes the redemption serial number N' and the redemption random number key K' of the lottery play record to be validated.

In step 604, the validation unit 206 instructs the transmission unit 204 to transmit the redemption serial number N' only via the network 24 to a corresponding GS server 28. In step 606, the retrieving unit 302 of the corresponding GS server 28 retrieves the play information P and the play digital signature S from the database 314 using the redemption serial number N'. In step 608, the transmission unit 304 of the corresponding GS server 28 transmits the retrieved play information P and play digital signature S to the play redemption unit 18.

In step 610, the receiving unit 202 of the play redemption unit 18 receives the play information P and play digital signature S from the corresponding GS server 28. The validation unit 206 of the play redemption unit 18 then generates the validation digital signature S' as a function of the received play information P and the redemption random number key K'. For example, the validation digital signature S' can be calculated using the HMAC method based on the play information P and the redemption random number key K'.

In step 612, the validation unit 206 of the play redemption unit 18 compares the validation digital signature S' to the play digital signature S to validate the authenticity of the lottery play record being validated. If the validation digital signature S' matches the play digital signature S, the method proceeds to step 614. Otherwise, the method returns to step 602. In step 614, the transmission unit 204 of the play redemption unit 18 transmits the redemption serial number N' and the redemption random number key K' of the lottery play record to the corresponding GS server 28. In step 616, the retrieving unit 302 of the corresponding GS server 28 receives the redemption serial number N' and the redemption random number key K' from the play redemption unit 18 via the network 24, and transmits the redemption serial number N' and the redemption random number key K' to an ICS 30 associated with the corresponding GS server 28 via the network 32.

In step 618, the retrieving unit 402 of the ICS 30 retrieves the play information P and the play digital signature S in the database 414 using the redemption serial number N'. In step 620, the presentment confirmation unit 406 of the ICS 30 generates the presentment digital signature S" as a function of the play information P retrieved from the database 414 and the redemption random number key K'. In step 622, the presentment confirmation unit 406 compares the presentment digital signature S" to the play digital signature S retrieved from the database 414 to validate presentment of the lottery ticket being validated. If the presentment digital signature S" matches the play digital signature S, the method proceeds to step 624. Otherwise, the method returns to step 602.

In step 624, the presentment confirmation unit 406 of the ICS 30 authorizes payment remittance and transmits payment remittance information, such as a payment amount and a payment date, to the confirmation unit 306 of the corresponding GS server 28. In step 626, the confirmation unit 306 of the corresponding GS server 28 transmits any applicable informational messages related to the validation process to the print unit 112 of the play generation unit 16 via the network 24. The print unit 112 displays or prints the informational messages on the printer 20. The method ends at step 628 which may include a return to step 602. Any of steps 602-626 can be repeated as desired.

Embodiments of the present disclosure are described above by way of example only, with reference to the accompanying drawings. Further, the description is merely exemplary in nature and is in no way intended to limit the disclosure, its application, or uses. As used herein, the algorithms described above may refer to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units of the apparatus, the scope of the present disclosure should not be so limited since other modifications will become apparent to the skilled practitioner.

The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated. It is therefore contemplated that the present disclosure covers any and all modifications, variations or equivalents that fall within the spirit and scope of the basic underlying principles disclosed above and claimed herein.

What is claimed is:

1. A lottery transaction processing method, comprising:
   receiving a redemption serial number of a lottery play record to be validated over a network by a gaming system server, wherein in association with issuance of the lottery play record, play information, a random number key, and a digital signature generated as a function of the play information and the random number key, were generated, and wherein the play information and the digital signature, but not the random number key, are stored by the gaming system server in association with the issuance of the lottery play record;
   retrieving the play information and the play digital signature associated with the received redemption serial number from storage by the gaming system server;
   generating a validation digital signature as a function of the play information retrieved from the storage by the gaming system server and a redemption random number key provided in association with the lottery play record to be validated;
   comparing the validation digital signature to the play digital signature retrieved from the storage by the gaming system server to validate authenticity of the lottery play record being validated; and
   determining the authenticity of the lottery play record based on a match between the validation digital signature and the play digital signature.

2. The method of claim 1, further comprising:
   receiving by the gaming system server over the network the redemption random number key;
   generating the validation digital signature includes generating the validation digital signature by the gaming system server; and
   comparing the validation digital signature to the play digital signature includes comparing the validation digital signature to the play digital signature by the gaming system server.

3. The method of claim 1, further comprising at least one of:
   transmitting the play information and play digital signature over a network from the gaming system server to a lottery internal control system for storage by the lottery internal control system; and
   transmitting the play information and play digital signature over a network from the gaming system server to a lottery play redemption processor for storage by the lottery play redemption processor.

4. The method of claim 1, further comprising transmitting the redemption serial number and the redemption random number key of the lottery play record to be validated from the gaming system server to the lottery internal control system if the authenticity of the lottery play record is validated by the gaming system server.

5. A lottery transaction processing method, comprising:
   receiving a redemption serial number and a redemption random number key of a lottery play record to be validated for presentment by a lottery internal control system, wherein in association with issuance of the lottery play record, play information, a random number key, and a digital signature generated as a function of the play information and the random number key, were generated, and wherein the play information and the digital signature, but not the random number key, are stored by the lottery internal control system in association with the issuance of the lottery play record;

retrieving the play information and the play digital signature associated with the redemption serial number from storage by the lottery internal control system;

generating a presentment digital signature as a function of the play information retrieved from the storage by the lottery internal control system and the redemption random number key by the lottery internal control system;

comparing the presentment digital signature to the play digital signature retrieved from storage by the lottery internal control system to validate presentment of the lottery play record; and determining, by the lottery internal control system, authenticity of the presentment of the lottery play record based on a match between the presentment digital signature and the play digital signature.

6. The method of claim 5, further comprising:
receiving the play information and play digital signature over a network from a gaming system server for storage by the lottery internal control system; and
receiving the redemption serial number and the redemption random number key of the lottery play record to be validated for presentment from the gaming system server by the lottery internal control system if the authenticity of the lottery play record is validated.

7. The method of claim 5, further comprising determining whether the lottery play record being validated for presentment was presented for payment if the presentment digital signature matches the play digital signature.

8. The method of claim 1, further comprising:
transmitting the play information and play digital signature over a network from the gaming system server to a lottery play redemption processor;
generating the validation signature includes generating the validation digital signature by the lottery play redemption processor; and
comparing the validation digital signature to the play digital signature includes comparing the validation digital signature to the play digital signature by the lottery play redemption processor.

* * * * *